United States Patent
Mahmoud et al.

(10) Patent No.: US 10,179,874 B2
(45) Date of Patent: Jan. 15, 2019

(54) METHOD OF FRACTURING A SUBTERRANEAN FORMATION USING MICRONIZED BARITE PARTICLES

(71) Applicant: KING FAHD UNIVERSITY OF PETROLEUM AND MINERALS, Dhahran (SA)

(72) Inventors: Mohamed Mahmoud, Dhahran (SA); Salaheldin Elkatatny, Dhahran (SA); Abdulwahab Zaki Ali, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 6 days.

(21) Appl. No.: 15/397,494

(22) Filed: Jan. 3, 2017

(65) Prior Publication Data

US 2017/0190955 A1 Jul. 6, 2017

Related U.S. Application Data

(60) Provisional application No. 62/274,423, filed on Jan. 4, 2016.

(51) Int. Cl.
| | |
|---|---|
| *E21B 43/267* | (2006.01) |
| *C09K 8/66* | (2006.01) |
| *C01F 11/46* | (2006.01) |
| *C09K 8/05* | (2006.01) |
| *E21B 43/26* | (2006.01) |
| *C09K 8/84* | (2006.01) |

(52) U.S. Cl.
CPC ............ *C09K 8/665* (2013.01); *C01F 11/462* (2013.01); *C09K 8/05* (2013.01); *C09K 8/845* (2013.01); *E21B 43/26* (2013.01); *E21B 43/267* (2013.01); *C01P 2004/61* (2013.01); *C09K 2208/34* (2013.01)

(58) Field of Classification Search
CPC ...... E21B 21/003; E21B 21/08; E21B 33/138; E21B 43/26; E21B 43/267; E21B 21/066
See application file for complete search history.

(56) References Cited

U.S. PATENT DOCUMENTS

| | | | |
|---|---|---|---|
| 7,220,707 B2 | 5/2007 | Massam et al. | |
| 2008/0108528 A1 | 5/2008 | Matlock et al. | |
| 2014/0367105 A1* | 12/2014 | Karcher | C09K 8/426 |
| | | | 166/295 |

FOREIGN PATENT DOCUMENTS

EP    1960313    8/2008

OTHER PUBLICATIONS

Shende, A.V., et al., "Dissolution of Barite Scale using Chelating Agents", Texas A&M University, 68 Pages total, (May 2012).

* cited by examiner

*Primary Examiner* — Zakiya W Bates

(74) *Attorney, Agent, or Firm* — Oblon, McClelland, Maier & Neustadt, L.L.P.

(57) ABSTRACT

A drilling fluid composition that contains micronized barite particles with a particle size in the range of 1 to 5 μm, and also a method of fracturing a subterranean formation using the drilling fluid composition. Various embodiments of the micronized barite particles and the method of making thereof, the drilling fluid composition, and the method of fracturing a subterranean formation are also provided.

14 Claims, 8 Drawing Sheets

METHOD OF FRACTURING A SUBTERRANEAN FORMATION USING MICRONIZED BARITE PARTICLES

CROSS REFERENCE TO RELATED APPLICATIONS

This application s based on, and claims the benefit of priority to, provisional application No. 62/274,423 filed Jan. 4, 2016, the entire contents of which are incorporated herein by reference.

BACKGROUND OF THE INVENTION

Technical Field

The present invention relates to a drilling fluid composition that contains micronized barite particles as a weighting agent, and also a method of fracturing a subterranean formation using the drilling fluid composition.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Drilling fluids or muds are used in the rotary drilling process of wells to tap underground collections of oil and gas. These muds have several functions. The most important functions are to assist in the removal of cuttings from the well, to seal off unwanted formations which may be encountered at different levels preventing the loss of drilling fluids to void spaces and to permeable or porous formations, to lubricate the drilling tool, to maintain the well bore pressure and stability of the bore hole, and to hold the cuttings in the suspension during events of shutdowns in drilling.

Drilling fluid additives form a thin, low permeability filter cake (mud cake) over time that seals openings in formations to reduce the unwanted influx of fluids into permeable formations. A mud cake forms when the drilling fluid contains particles that are approximately the same size as or have diameters greater than about one third of the pore diameter (or the width of any opening such as induced fractures) in the formation being drilled. The drilling fluid must circulate in the wellbore (down the drill pipe and back up the annulus) to perform the above mentioned functions for the drilling process to continue smoothly. Therefore, the drilling fluid must remain in the wellbore all the time in order to control and prevent caving of the wellbore.

Drilling fluid compositions generally include one or more weighting agents such as barite, iron oxides, manganese tetraoxide, potassium formate, hematite, and calcium carbonate, etc. to increase the overall density of the drilling fluid so that sufficient bottom hole pressure can be maintained thereby preventing an unwanted influx of formation fluids.

Barite is one of the most common weighting agents used in drilling fluids, completion fluids, cementing fluids, etc. in deep oil and gas wells. Generally, the barite particle size used in drilling fluid ranges from 30 to 70 μm. The invasion of the mud filtrate due to the pressure difference will create mud cake that mainly composed of barite having particle size of 30 to 70 μm, which can cause barite scale formation and further reduce the reservoir permeability. Additionally, it was shown that barite particles facilitate the formation of barite scales around casing and production tubing, yet cause erosion of surface chokes and valves. Consequently, the process of removing the mud cake (filter cake) and/or barite scales could be very costly, particularly in horizontal reservoirs and extended reach wells, when barite particles with a particle size of 30 to 70 μm is used as the weighting agent in the formulation of the drilling fluid.

In view of the forgoing, one objective of the present invention is to provide a drilling fluid composition that contains micronized barite particles as a weighting agent, and to provide a method of fracturing a subterranean formation using the drilling fluid composition.

BRIEF SUMMARY OF THE INVENTION

According to a first aspect, the present disclosure relates to a method of fracturing a subterranean formation, involving i) injecting a drilling fluid composition into the subterranean formation through a wellbore to fracture the subterranean formation and form fissures in the subterranean formation, wherein the drilling fluid composition includes a) micronized barite particles with a particle size in the range of 1 to 5 μm, b) an aqueous base fluid, c) a viscosifier, wherein the micronized barite particles are present in the drilling fluid composition at a concentration in the range of 1 wt % to 50 wt %, relative to the total weight of the drilling fluid composition.

In one embodiment, the method of fracturing further involves injecting a proppant into the subterranean formation through the wellbore to deposit the proppant in the fissures.

In one embodiment, the method of fracturing further involves circulating the drilling fluid composition within the wellbore after injecting the drilling fluid composition.

In one embodiment, the drilling fluid composition is injected at a pressure of at least 5,000 psi to fracture the subterranean formation.

In one embodiment, the viscosifier is bentonite.

In one embodiment, the drilling fluid composition has a plastic viscosity of 14 to 18 cP at a temperature of 80 to 90° F.

In one embodiment, the drilling fluid composition has a plastic viscosity of 4.5 to 7.0 cP at a temperature of 200 to 280° F.

In one embodiment, the drilling fluid composition has a density of 12 to 14 ppg at a temperature of 80 to 90° F.

In one embodiment, the drilling fluid composition has a yield point of 35 to 45 lb/100 ft$^2$ at a temperature of 80 to 90° F.

In one embodiment, the drilling fluid composition has a gel strength of 15 to 25 lb/100 ft$^2$ at a temperature of 80 to 90° F., after 10 seconds.

In one embodiment, the drilling fluid composition has a yield point-to-plastic viscosity ratio of 2.5 to 4.5.

In one embodiment, the drilling fluid composition has a zeta potential of 55 to 65 mV.

In one embodiment, a solubility of the micronized barite particles in the aqueous base fluid is at least 70 g/100 g at a temperature of 150 to 250° F.

In one embodiment, the drilling fluid composition further includes at least one additive selected from the group consisting of an antiscalant, a thickener, a deflocculant, an anionic polyelectrolyte, a lubricant, and a fluid loss additive.

According to a second aspect, the present disclosure relates to a method of making micronized barite particles, involving i) stirring a suspension solution comprising a barite mixture and at least one chelating agent, ii) filtering the suspension solution to form a filter cake comprising barite, iii) grinding the filter cake to form the micronized barite particles each having a particle size in the range of 1 to 5 μm, wherein an amount of barite in the barite mixture is at least 80 wt %, and wherein an amount of said chelating agent in the suspension solution is in the range of 1 wt % to 20 wt %, relative to the total weight of the suspension solution.

In one embodiment, the method of making the micronized barite particles further involves grinding the barite mixture prior to the stirring.

In one embodiment, the suspension solution is centrifugally stirred with a rotational speed of at least 500 rpm, at a temperature in the range of 40 to 80° C.

In one embodiment, the amount of barite in the barite mixture is at least 95 wt %, wherein the amount of the chelating agent in the solution is in the range of 1 wt % to 10 wt %.

In one embodiment, the chelating agent is at least one selected from the group consisting of ethylenediamine tetraacetic acid, glutamic diacetic acid, hydroxyethylenediamine triacetic acid, and salts thereof.

In one embodiment, the suspension solution has a pH in the range of 7 to 14.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
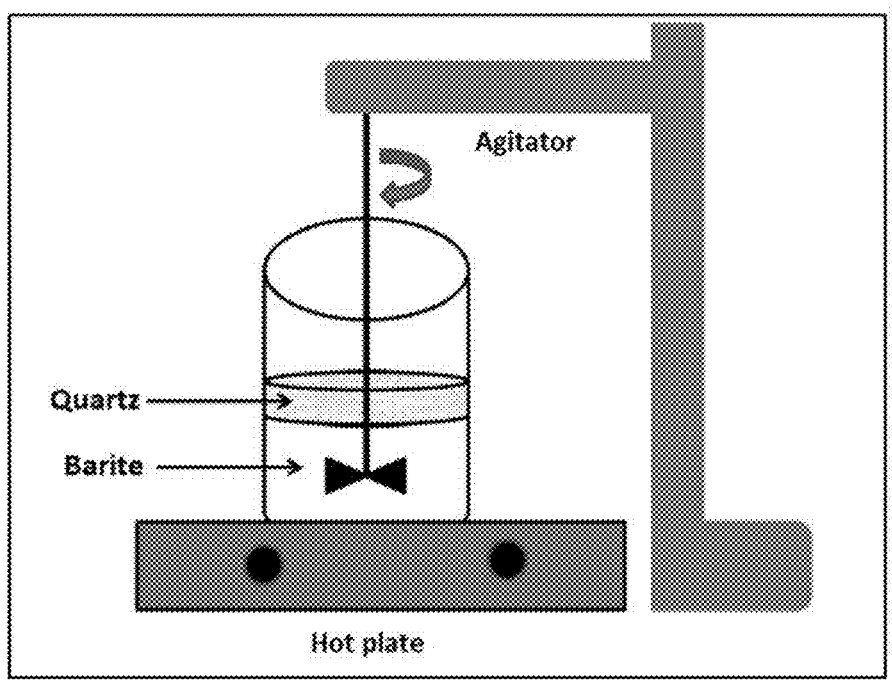
FIG. 1 is schematic of a lab-scale setup for making micronized barite particles.

According to a first aspect, the present disclosure relates to a method of fracturing a subterranean formation, involving injecting a drilling fluid composition into the subterranean formation through a wellbore to fracture the subterranean formation and form fissures in the subterranean formation.

"Fracturing" or "fracking" as used herein refers to the process of initiating and subsequently propagating a fracture of the rock layer by employing the pressure of a fluid as the source of energy. In some embodiments, fracking is accomplished by pumping in liquids at high pressure. A hydraulic fracture may be formed by pumping a fracturing fluid (i.e. the drilling fluid composition, in one or more of its embodiments) into the wellbore at a rate sufficient to increase the pressure downhole to a value in excess of a critical fracture pressure associated with the formation rock. The pressure causes the formation to crack, allowing the fracturing fluid to enter and extend the crack farther into the formation. Following fracking by high pressures, the fractured formation allows more hydrocarbons (e.g., methane, condensate, ethane, oil) and/or water to be extracted since the formation walls are more porous. The fracking may be performed on new wells or wells with poor production. Fracking can be done in vertical wells, slanted wells, and in horizontally drilled wells.

As used herein, a "wellbore" includes any geological structure or formation, that may contain various combinations of natural gas (i.e., primarily methane), light hydrocarbon or non-hydrocarbon gases (including condensable and non-condensable gases), light hydrocarbon liquids, heavy hydrocarbon liquids, crude oil, rock, oil shale, bitumen, oil sands, tar, coal, and/or water. Exemplary non-condensable gases include hydrogen, carbon monoxide, carbon dioxide, methane, and other light hydrocarbons.

In one embodiment, the drilling fluid composition is injected at a pressure of at least 5,000 psi, at least 5,500 psi, at least 6,000 psi, at least 6,500 psi, at least 7,000 psi, at least 7,500 psi, but no more than 10,000 psi to fracture the subterranean formation and form fissures in the subterranean formation.

In one embodiment, the method of fracturing further involves circulating the drilling fluid composition within the wellbore after injecting the drilling fluid composition. In one embodiment, the drilling fluid composition is circulated for at least 30 minutes, preferably at least 45 minutes, more preferably at least 60 minutes.

In one embodiment, the method of fracturing further involves injecting a proppant into the subterranean formation through the wellbore to deposit the proppant in the fissures and to maintain the structural integrity of the wellbore. A "proppant" as used herein refers to any granular material that, in an aqueous mixture, can be used to fracture the rock formation and to provide structural support to the wellbore and/or fissures that develop in the rock formation due to pressurizing the rock formation during fracking. In one embodiment, the proppant is grains of sand, ceramic, silica, quartz, or other particulates that prevent the fractures from closing when the injection is stopped.

The drilling fluid composition, which is injected into the subterranean formation, includes micronized barite particles.

Barite (i.e. barium sulfate, $BaSO_4$) is a dense mineral used as a weighting agent in drilling fluid compositions with a specific gravity in the range of 4.20 to 4.50 g/cm³. The term "micronized barite particles" as used herein refers to homogenized barite particles with a mean particle size in the range of 1 to 5 μm, preferably 1 to 4 μm, more preferably 1 to 3 μm, which are used as weighting agents to increase a density of the drilling fluid composition to at least 12 ppg (pounds per gallon), preferably at least 12.5 ppg. In a preferred embodiment, less than 1 wt %, preferably less than 0.5 wt % of a given amount of the micronized barite particles includes barite particles with a particle size of less than 1 micron. Furthermore, in another preferred embodiment, less than 2 wt %, preferably less than 1.5 wt %, preferably less than 1 wt % of a given amount of the micronized barite particles includes barite particles with a particle size of greater than 5 micron. Accordingly, in a preferred embodiment, at least 95 wt %, preferably at least 96 wt %, preferably at least 97 wt %, preferably at least 98 wt %, preferably at least 99 wt %, of a given amount of the micronized barite particles includes barite particles with a particle size in the range of 1 to 5 µm. In one embodiment, the amount of barite particles in the "micronized barite particles" is at least 99 wt %, preferably at least 99.5 wt %, preferably at least 99.9 wt %, wherein no more than 1 wt %, preferably no more than 0.5 wt %, preferably no more than 0.1 wt % of the "micronized barite particles" may include impurity particles such as bauxite, bentonite, dolomite, limestone, calcite, vaterite, aragonite, magnesite, taconite, gypsum, quartz, marble, hematite, siderite, ilmenite, limonite, magnetite, andesite, garnet, basalt, dacite, nesosilicates or orthosilicates, sorosilicates, cyclosilicates, inosilicates, phyllosilicates, tectosilicates, kaolins, montmorillonite, fullers earth, and halloysite, and the like. According to this embodiment, the size of the impurity particles may be in the range of 0.5 to 10 µm, preferably 1 to 8 µm, more preferably 1 to 5 µm.

In one embodiment, barite present in the micronized barite particles are local Saudi barite. A given amount of an untreated and unprocessed local Saudi barite includes at least 90 wt %, preferably at least 95 wt % of barite (i.e. $BaSO_4$), less than 5 wt %, preferably less than 4 wt % of silica (i.e. $SiO_2$), and less than 1 wt %, preferably less than 0.5 wt % of each of $SrSO_4$, $Fe_2O_3$, $MgO$, $CaO$, $Al_2O_3$, and traces amount of impurities such as calcite, gypsum, dolomite sulfur, halloysite, calcium carbonate, quartz, venniculite, and hematite. The composition of local Saudi barite may preferably be different than the composition of commercially barite ore extracted from other geographical areas, as a given amount of local Saudi barite includes at least 90 wt %, preferably at least 95 wt % of barite.

In a preferred embodiment, the micronized barite particles are present in the drilling fluid composition at a concentration in the range of 1 wt % to 80 wt %, preferably 5 wt % to 70 wt %, preferably 10 wt % to 60 wt %, preferably 15 wt % to 50 wt %, preferably 20 wt % to 50 wt %, preferably 25 wt % to 50 wt %, preferably 30 wt % to 50 wt %, preferably 35 wt % to 50 wt %, relative to the total weight of the drilling fluid composition.

The drilling fluid composition further includes an aqueous base fluid. The aqueous base fluid may refer to any water containing solution, including saltwater, hard water, and fresh water. For purposes of this description, the term "saltwater" will include saltwater with a chloride ion content of between about 6000 ppm and saturation, and is intended to encompass seawater and other types of saltwater including groundwater containing additional impurities typically found therein. The term "hard water" will include water having mineral concentrations between about 2000 mg/L, and about 300,000 mg/L. The term "fresh water" includes water sources that contain less than 6000 ppm, preferably less than 5000 ppm, preferably less than 4000 ppm, preferably less than 3000 ppm, preferably less than 2000 ppm, preferably less than 1000 ppm, preferably less than 500 ppm of salts, minerals, or any other dissolved solids. Salts that may be present in saltwater, hard water, and/or fresh water may be, but are not limited to, cations such as sodium, magnesium, calcium, potassium, ammonium, and iron, and anions such as chloride, bicarbonate, carbonate, sulfate, sulfite, phosphate, iodide, nitrate, acetate, citrate, fluoride, and nitrite. The aqueous base fluids are ordinarily classified as saltwater fluids when they contain over 1% salt (about 6000 ppm of chloride ion). In one embodiment, the aqueous base fluid is present in at least 40 wt % relative to the total weight of the drilling fluid composition, preferably at least 50%, preferably at least 60%, preferably at least 70%, preferably at least 80%, preferably at least 90%.

In one embodiment, a solubility of the micronized barite particles in the aqueous base fluid is at least 70 g/100 g, preferably at least 80 g/100 g, preferably at least 90 g/100 g at a temperature of 150 to 250° F., preferably 200° F. Accordingly, the solubility of the micronized barite particles in the aqueous base fluid at a temperature of 200° F. is increased by at least 10%, preferably at least 20%, preferably at least 30% when compared to that of a drilling fluid composition that is substantially the same having barite particles with a particle size of 40 to 70 µm.

The drilling fluid composition further includes a viscosifier. Exemplary viscosifiers include, but are not limited to bauxite, bentonite, dolomite, limestone, calcite, vaterite, aragonite, magnesite, taconite, gypsum, quartz, marble, hematite, limonite, magnetite, andesite, garnet, basalt, dacite, nesosilicates or orthosilicates, sorosilicates, cyclosilicates, inosilicates, phyllosilicates, tectosilicates, kaolins, montmorillonite, fullers earth, and halloysite and the like. In one embodiment, the viscosifier is present in an amount of 0.1 to 30 wt %, preferably 0.1 to 25 wt %, preferably 0.1 to 20 wt %, preferably 0.1 to 15 wt %, preferably 0.1 to 10 wt %, preferably 0.5 to 5 wt %, relative to the total weight of the drilling fluid composition.

In a preferred embodiment, the viscosifier is bentonite. Bentonite is an absorbent aluminum phyllosilicate, impure clay consisting primarily of montinorillonite. Montmorillonite generally comprises sodium, calcium, aluminum, magnesium, and silicon, and oxides and hydrates thereof. Other compounds may also be present in the bentonite of the present disclosure, including, but not limited to, potassium-containing compounds, and iron-containing compounds. There are different types of bentonite, named for the respective dominant element, such as potassium (K), sodium (Na), calcium (Ca) and aluminum (Al). Therefore, in terms of the present disclosure "bentonite" may refer to potassium bentonite, sodium bentonite, calcium bentonite, aluminum bentonite, and mixtures thereof, depending on the relative amounts of potassium, sodium, calcium, and aluminum in the bentonite. In one embodiment, the bentonite is present in 0.1 to 10 wt % relative to the total weight of the drilling fluid composition, preferably 0.1 to 5 wt %, preferably 0.1 to 2 wt %, preferably 0.1 to 1.5 wt %, preferably 0.5 to 1.0 wt %.

Thorough mixing of the aqueous base fluid, the micronized barite particles, and the bentonite is desirable to avoid creating lumps or "fish eyes." Preferably, the micronized barite particles are thoroughly mixed with the aqueous base fluid, and the viscosifier (e.g. bentonite) is added to the mixture thereafter. To avoid lumps or "fish eyes" the drilling fluid composition may be stirred with a stirring speed of 1-800 rpm, or 2-700 rpm, or 3-600 rpm. In one embodiment, the various ingredients of the drilling fluid composition (the micronized barite particles, the aqueous base fluid, and the viscosifier) are mixed for a sufficient period of time to allow for hydration of the bentonite clay in the aqueous base fluid, and this period of time is usually between about 5 and about 60 minutes, preferably between about 10 and about 40 minutes, preferably between about 20 and about 30 minutes. Other mixing times may be also utilized to make the drilling fluid composition (e.g. less than 5 minutes, or more than 60 minutes) so long as the drilling fluid composition is substantially free of lumps.

In a preferred embodiment, the micronized barite particles are mixed with the aqueous base fluid via a roll-milling mixer. A thorough mixing of the micronized barite particles with the aqueous base fluid may be provided via a roll-milling mixer, without formation of lumps or "fish eyes". In one embodiment, the micronized barite particles are sonicated after being mixed with the aqueous base fluid, but prior to be roll-milled.

In one embodiment, the pH of the drilling fluid composition may be adjusted depending on the drilling application or problems that may be encountered during a drilling operation. For example, the pH of the drilling fluid composition may be adjusted so as to provide for preferable solubility of the various organic components in the dispersion (e.g. organic components from the micronized barite particles, the preservative, the stabilizing agent, the antiscalant, the thickener, etc.) and is preferably between about 7 and 14, preferably between about 8 and 12, more preferably between about 10 and 12, more preferably between about 10 and 11. This pH range may also be advantageously suited for drilling operations where acid promoted damage/corrosion to equipment, such as metal equipment is a concern. In one embodiment, the pH of the drilling fluid composition is between about 1 and 8, preferably 2 and 7, more preferably 3 and 6. This pH range may be advantageously suited for drilling applications where scale formation is particularly problematic for example. Various acids (e.g. citric acid, phosphoric acid, hydrochloric acid, etc.), bases (e.g. hydroxide bases, carbonate bases, amine bases, etc.), and buffers (e.g. monosodium phosphate, disodium phosphate, sodium tripolyphosphate, etc.) may be used to buffer or to adjust the pH of the drilling fluid composition, and such acids, bases, and buffers are known to those of ordinary skill in the art.

American Petroleum Institute (API) specifications of the drilling fluid compositions that include the aqueous base fluid, the micronized barite particles, and the viscosifier determined using a Fann viscometer (or a V-G meter). The drilling fluid compositions are prepared after mixing the drilling fluid compositions for 20 minutes, overnight aging, and stirring for 25 an additional five minutes. The Fann meter is used to determine standard drilling fluid parameters as follows:

Plastic viscosity (PV, cp)=600 dial (i.e. rpm reading)−300 dial

Yield point (YP, lb/100 ft$^2$)=300 dial−plastic viscosity

Gel Strength (GS, lb/100 ft$^2$) is measured by taking a 3 rpm reading, allowing the drilling fluid composition to set for 10 seconds or for 10 minutes or for 30 minutes. A difference in these readings between about 1 and 8 is preferred.

It should be recognized that the above parameters are interrelated, and once an acceptable plastic viscosity has been obtained, the other values may be adjusted by adjusting the proportions of the micronized barite particles, the viscosifier, and other additives.

In one embodiment, the drilling fluid composition has a plastic viscosity of 14 to 18 cP, preferably 15 to 17 cP, preferably about 16 cP at a temperature of 80 to 90° F., preferably about 85° F.

In another embodiment, the drilling fluid composition has a plastic viscosity of 4.5 to 7.0 cP, preferably 4.5 to 6.5 cP, preferably 5 to 6.5 cP, at a temperature of 200 to 280° F., preferably 200 to 250° F. Accordingly, the plastic viscosity of the drilling fluid composition at a temperature of 200 to 280° F., preferably 200 to 250° F. is reduced by at least 50%, preferably at least 55%, more preferably at least 60% when compared to a drilling fluid composition that is substantially the same having barite particles with a particle size of 40 to 100 μm, preferably 40 to 80 μm, preferably 40 to 70 μm, which has a plastic viscosity of 10 to 12 cP, preferably 10 to 10.5 cP, at a temperature of 200 to 280° F., preferably 200 to 250° F.

In one embodiment, the drilling fluid composition has a yield point of 35 to 45 lb/100 ft$^2$, preferably 35 to 45 lb/100 ft$^2$ at room temperature (i.e. a temperature of 80 to 90° F., preferably about 85° F.). Accordingly, the yield point of the drilling fluid composition at room temperature is lower by about 1.0 lb/100 ft$^2$, preferably about 2.0 lb/100 ft$^2$ compared to a drilling fluid composition that is substantially the same having barite particles with a particle size of 40 to 100 μm, preferably 40 to 80 μm, preferably 40 to 70 μm. However, the yield point of the drilling fluid composition at an elevated temperature (e.g. a temperature of 200 to 280° F., preferably 200 to 250° F.) is higher by about 1.5 lb/100 ft$^2$, preferably about 2.5 lb/100 ft$^2$ compared to a drilling fluid composition that is substantially the same having barite particles with a particle size of 40 to 100 μm, preferably 40 to 80 μm, preferably 40 to 70 μm. In one embodiment, the drilling fluid composition has a gel strength of 15 to 25 lb/100 ft$^2$, preferably 15 to 20 lb/100 ft$^2$, preferably 15 to 18 lb/100 ft$^2$, after 10 seconds, at room temperature (i.e. a temperature of 80 to 90° F., preferably about 85° F.). The gel strength may rise to a value of 20 to 25 lb/100 ft$^2$, preferably 20 to 22 lb/100 ft$^2$, after 10 minutes, at room temperature. Further, the gel strength may rise to a value of 20 to 25 lb/100 ft$^2$, preferably 22 to 25 lb/100 ft$^2$, after 30 minutes, at room temperature. In view of that, the gel strength of the drilling fluid composition at room temperature is about the same compared to a drilling fluid composition that is substantially the same having barite particles with a particle size of 40 to 100 μm, preferably 40 to 80 μm, preferably 40 to 70 μm.

In one embodiment, the drilling fluid composition has a yield point-to-plastic viscosity ratio (i.e. YP/PV) of 2.5 to 4.5, preferably 3.5 to 4.2, preferably 3.5 to 4.0. Accordingly, the YP/PV of the drilling fluid composition is at least two times, preferably at least three times larger when compared to a drilling fluid composition that is substantially the same having barite particles with a particle size of 40 to 70 μm, which has a YP/PV of 1.5 to 2.0.

In one embodiment, the drilling fluid composition has a density of 12 to 14 ppg (pounds per gallon), preferably 12 to 13 ppg, preferably 12 to 12.5 ppg at room temperature (i.e. a temperature of 80 to 90° F., preferably about 85° F.). Accordingly, the density of the drilling fluid composition at room temperature is about the same compared to a drilling fluid composition that is substantially the same having barite particles with a particle size of 40 to 100 μm, preferably 40 to 80 μm, preferably 40 to 70 μm.

In one embodiment, the drilling fluid composition has a zeta potential of about 55 to 65 mV, preferably about 55 to 60 mV, preferably about 60 mV. Accordingly, the zeta potential of the drilling fluid composition is higher (i.e. about 55 to 65 mV, preferably about 55 to 60 mV, preferably about 60 mV) than the zeta potential of a drilling fluid composition that is substantially the same having barite particles with a particle size of 40 to 100 μm, preferably 40 to 80 μm, preferably 40 to 70 μm, which has a zeta potential of about 40 to 50 mV, preferably 40 to 45 mV.

In one embodiment, the drilling fluid composition further includes at least one additive selected from the group consisting of an antiscalant, a thickener, a deflocculant, an anionic polyelectrolyte, a lubricant, and a fluid loss additive. In one embodiment, the total weight of the at least one additive present in the drilling fluid composition is up to 10 wt %, preferably up to 9 wt %, preferably up to 8 wt %, preferably up to 7 wt %, preferably up to 6 wt %, preferably up to 5 wt %, preferably up to 4 wt %, preferably up to 3 wt %, preferably up to 2 wt %, preferably up to 1 wt %, preferably up to 0.5 wt %, preferably up to 0.1 wt %, preferably up to 0.01 wt %, relative to the total weight of the drilling fluid composition.

In one embodiment, the at least one additive may be injected into the subterranean formation as a separate component from the drilling fluid composition. The additive may therefore be injected into the subterranean formation through a wellbore at a pressure of at least 5,000 psi, at least 5,500 psi, at least 6,000 psi, at least 6,500 psi, at least 7,000 psi, at least 7,500 psi, but no more than 10,000 psi, in addition to the drilling fluid composition, to fracture the subterranean formation, or may be injected into the subterranean formation through the wellbore after the fracking.

In one embodiment, an antiscalant is incorporated as a part of the drilling fluid composition. The term "antiscalant" refers to any chemical agent that prevents, slows, minimizes, and/or stops the precipitation of scale (e.g. calcium carbonate, calcium sulfate, barium sulfate, strontium sulfate, calcium phosphate, calcium fluoride, calcium silicate, magnesium hydroxide, zinc carbonate, and the like) from the aqueous salt solution. Antiscalants which may be used in the present disclosure include, phosphine or sodium hexametaphosphate, sodium tripolyphosphate and other inorganic polyphosphates, hydroxy ethylidene diphosphonic acid, butane-tricarboxylic acid, phosphonates, or phosphonic acids such as amino tris (methylenephosphonic acid) (ATMP), etc. carboxyl group-containing starting material acids, maleic acid, acrylic acid and itaconic acid and the like, polycarboxylic acid polymers, sulfonated polymers, vinyl sulfonic acid, allyl sulfonic acid, and 3-allyloxy-2-hydroxypropionic acid and other vinyl monomers having a sulfonic acid group, or a non-ionic acrylamide monomer from the vinyl copolymer, and the like. Further, organic acids which are safe under the FDA GRAS guidelines for food production yet still effective in decomposition of carbonates found in the soils and in rock formations may be used. The basic principle action of organic acids on carbonates is to cause the disassociation or the carbonate to produce the oxide and carbon dioxide. The first group of suitable organic acids is lactic, acetic, formic, fumaric, citric, oxalic, adipic and uric. The second group of suitable organic acids is the carboxylic acids, whose acidity is associated with their carboxyl group —COOH. Sulfonic acids, containing the group —SO$_2$OH, are relatively stronger acids. The relative stability of the conjugate base of the acid determines its acidity. In some biological systems more complex organic acids such as L-lactic, citric, and D-glucuronic acids are formed. These use the hydroxyl or carboxyl group. The third group of suitable organic acids is humic, sebacic, stearic, gallic, palmitic, caffeic, glyoxylic, fulvic, carnosic, anthranilic, ellagic, lipoic, chlorogenic, rosmarinic, phosphoric, methacrylic, oleanic, nitrohumic, florocinnamic, hexaflorosilicic, hydrofluoric, hydroxycitric and silicofluoric. The fourth group of suitable organic acids is fruit acids. The acids in fruits are chiefly acetic, malic, citric, tartaric, oxalic, and in some instances boric. Malic acid is present in apples, pears, currants, blackberries, raspberries, quince, pineapple, cherries, and rhubarb. Citric acid is found in lemons, oranges, grapefruit, lemons, limes, quince, gooseberry, strawberry, raspberry, currant, and cranberry. Tartaric acid occurs in grapes. Boric acid is found in many fresh fruits and vegetables. Mandelic acid is present in almonds. The fifth group of suitable organic acids is beta hydroxy acids which is a type of phenolic acid. Salicylic acid is a colorless crystalline organic acid whose main active ingredient obtained from this source is a monohydroxybenzoic acid.

In one embodiment, a thickener is present in the drilling fluid composition. Various thickeners may be used to influence the viscosity of the fluid, and exemplary thickeners include xanthan gum, guar gum glycol, carboxymethylcellulose, polyanionic cellulose (PAC), or starch, and mixtures thereof.

A deflocculant may also be incorporated into the drilling fluid composition. A deflocculant is a chemical additive to prevent a colloid from coining out of suspension or to thin suspensions or slurries, and may be used to reduce viscosity of clay-based fluids. One type of deflocculant is an anionic polyelectrolyte, such as acrylates, polyphosphates, lignosulfonates (Lig), or tannic acid derivates such as Quebracho.

In one embodiment, the drilling fluid composition also includes a lubricant, such as an oil, for lubrication and fluid loss control. The lubricant may be a synthetic oil or a biolubricant, such as those derived from plants and animals for example vegetable oils. Synthetic oils include, but are not limited to, polyalpha-olefin (PAO), synthetic esters, polyalkylene glycols (PAG), phosphate esters, alkylated naphthalenes (AN), silicate esters, ionic fluids, multiply alkylated cyclopentanes (MAC). Exemplary vegetable oil-based lubricants (i.e. biolubricants) that may be used in the present disclosure include canola oil, castor oil, palm oil, sunflower seed oil and rapeseed oil from vegetable sources, and Tall oil from tree sources, and the like.

Further, a fluid loss additive may be incorporated into the drilling fluid composition to control loss of drilling fluids into permeable formations. In addition to micronized barite particles, in one or more of their embodiments, additional fluid loss additives may be added to the composition including, but not limited to, starch, xanthan gum, guar, carboxymethyl cellulose, polysaccharides, and acrylic polymers such as polyacrylamide. In one embodiment, the fluid loss additive is added in an amount necessary to achieve the desired fluid loss control, preferably less than 5 wt %, preferably less than 4 wt %, preferably less than 3 wt %, preferably less than 2 wt %, preferably less than 1 wt %, relative to the total weight of the drilling fluid composition.

The drilling fluid composition may also include a weighting agent besides the micronized barite particles to increase the overall density of the drilling fluid so that sufficient bottom hole pressure can be maintained thereby preventing an unwanted (and often dangerous) influx of formation fluids. Exemplary weighting agents include sodium sulfate, calcium carbonate (chalk), hematite, siderite, ilmenite, and any combination thereof. The weighting agent may be added to the prepared drilling fluid composition without adversely affecting its stability or other properties. In view of this embodiment, if one or more weighting agents are present in the drilling fluid composition besides the micronized barite particles, the one or more weighting agents preferably have a mean particle size in the range of 1 to 5 μm, preferably 1 to 4 μm, preferably 1 to 3 μm. In another embodiment, a weight ratio of the micronized barite particles to the one or more weighting agents is at least 2, preferably at least 3, preferably at least 4, preferably at least 5, preferably at least 6, preferably at least 7, preferably at least 8, preferably at least 9, preferably at least 10, preferably at least 15, preferably at least 20, but no more than 50.

According to a second aspect, the present disclosure relates to a method of making micronized barite particles, involving stirring a suspension solution comprising a barite mixture and at least one chelating agent. In one embodiment, the suspension solution is centrifugally stirred (e.g. using a centrifugal mixer or an agitator, as shown in FIG. 1) with a rotational speed of at least 500 rpm, preferably at least 600 rpm, preferably at least 800 rpm, but no more than 2000 rpm, for at least 1 hour, preferably at least 2 hours, but no more than 3 hours. Preferably, the suspension solution is stirred at a temperature in the range of 40 to 80° C., preferably 40 to 70° C. This temperature may be provided by a heating jacket or a hot plate (as shown in FIG. 1).

The "barite mixture" as used herein refers to a solid mixture that includes barium sulfate (barite) and impurities such as sodium sulfate, aluminum oxide, manganese tetraoxide, potassium formate, hematite, siderite, ilmenite, cement, pyrrhotite, gypsum, anhydrite, calcium carbonate, and the like. In a preferred embodiment, an amount of barite in the barite mixture is at least 80 wt %, preferably at least 90 wt %, preferably at least 95 wt %, preferably at least 99 wt %, relative to the total weight of the barite mixture.

In a preferred embodiment, the method further involves grinding the barite mixture prior to the stirring, followed by sieving ground barite mixture, classifying the ground barite mixture into a class of particles with a particle size of greater than 50 μm, a class of particles with a particle size of 20 to 50 μm, and a class of particles with a particle size of smaller than 20 μm.

In another preferred embodiment, the method further involves treating the barite mixture with a leaching acid prior to the stirring, to leach and remove acid-soluble impurities from the barite mixture. In one embodiment, the leaching acid is a mineral acid selected from the group consisting of hydrochloric acid and/or sulfuric acid.

The "chelating agent" as used herein refers to a chemical used to bind metal ions to form a ring structure. The chelating agent may stabilize the suspension solution by preventing the precipitation of at least a portion of the impurities of the barite mixture. Preferably, the chelating agent may not interact with the barite particles; however, the chelating agent interacts with at least a portion of the impurities in the suspension solution. In view of that, barite particles preferably precipitate, whereas those impurities, which interact with the chelating agent, may stabilize and remain in a soluble form in the suspension solution until the chelating agent is removed from the suspension solution, leaving behind the barite particles and other impurity particles that are insoluble in the chelating agent. In one embodiment, the barite particles and impurity particles have a mean particle size in the range of 1 to 80 μm, preferably 1 to 70 μm, preferably 1 to 60 μm, preferably 1 to 50 μm.

The chelating agent may have a pH of at least 10, preferably at least 11. In view of the pH of the chelating agent, the suspension solution may have a pH in the range of 7 to 14, preferably 10 to 12.

In a preferred embodiment, the chelating agent is at least one selected from the group consisting of EDTA (ethylenediamine tetraacetic acid), GLDA (glutamic diacetic acid), and HEDTA (hydroxyethylenediamine triacetic acid), and salts thereof. Further to these chelating agents, one or more chelating agents may also be added to the suspension solution selected from the group consisting of NTA (nitrolotriacetic acid), DTPA (diethylenetriaminepentaacetic acid), MGDA (methylglycinediacetic acid), HEIDA (2-hydroxyethyliminodiacetic acid), CDTA (trans-cyclohexane-1, 2-diaminetetraacetic acid), EGTA (ethylene glycol-bis(β-aminoethyl ether)-N,N,N',N'-tetraacetic acid), EDDA (ethylenediaminediacetic acid), and salts thereof.

The amount of the chelating agent in the suspension solution may vary depending on the type of the chelating agent and the amount of barite in the barite mixture. For example, in one embodiment, the amount of barite in the barite mixture is at least 80 wt %, preferably at least 85 wt %, but no more than 90 wt %. In view of that, the amount of the chelating agent in the suspension solution is in the range of 5 wt % to 20 wt %, preferably 5 wt % to 15 wt % when the chelating agent is EDTA, whereas the amount of the chelating agent in the suspension solution is in the range of 5 wt % to 20 wt %, preferably 10 wt % to 20 wt % when the chelating agent is GLDA. In another embodiment, the amount of barite in the barite mixture is at least 95 wt %, preferably at least 99 wt % (such as the local Saudi barite). In view of that, the amount of the chelating agent in the suspension solution is in the range of 1 wt % to 10 wt %, preferably 1 wt % to 5 wt %, when the chelating agent is EDTA, whereas the amount of the chelating agent in the suspension solution is in the range of 1 wt % to 10 wt %, preferably 5 wt % to 10 wt % when the chelating agent is GLDA. Each weight percent of the chelating agent is relative to the total weight of the suspension solution, whereas each weight percent of the barite particles is relative to the total weight of the barite mixture.

The method further involves filtering the suspension solution to form a filter cake comprising the barite particles and impurity particles that are insoluble in the chelating agent. "Filtering" is used herein to separate the barite particles from impurity particles that are soluble in the chelating agent. Therefore, "filtering" as used herein, refers to a process of removing the chelating agent from the suspension solution, whereby impurity particles that interact with the chelating agent leave the suspension solution, leaving behind the filter cake. Accordingly, the filter cake preferably refers to dry particles including barite particles and impurity particles that are insoluble in the chelating agent. In a preferred embodiment, the filter cake includes at least 80 wt %, preferably at least 85 wt %, preferably at least 90 wt %, preferably at least 95 wt %, preferably at least 99 wt % of barite particles with a particle size in the range of 1 to 80 μm, preferably 1 to 70 μm, preferably 1 to 60 μm, wherein less than 20 wt %, preferably less than 15 wt %, preferably less than 10 wt %, preferably less than 5 wt %, preferably less than 1 wt % of the filter cake includes impurity particles that are insoluble in the chelating agent.

In one embodiment, the impurity particles that are insoluble in the chelating agent (e.g. hematite, siderite, ilmenite, cement, pyrrhotite, gypsum, anhydrite, calcium carbonate, etc.) may precipitate on top of the barite particles (as shown in FIG. 1), after the chelating agent is removed from the suspension solution. Therefore, the impurity particles may be removed before grinding the barite particles. Preferably, the impurity particles do not include barite particles (as barite particles may precipitate first and the impurity particles may precipitate thereafter), and thus can be removed, for example, by pumping.

The method further involves grinding the filter cake to form the micronized barite particles each having a particle size in the range of 1 to 5 μm, preferably 1 to 4 μm, preferably 1 to 3 μm. Preferably, "grinding" may be performed after removing the impurity particles from the filter cake, although "grinding" may also be performed without removing the impurity particles when the amount of impurity particles in the filter cake is less than 5 wt %, preferably 1 wt %. The filter cake may be air-dried before grinding. Accordingly, the filter cake is exposed to an air stream at a temperature in the range of 80 to 90° F., preferably about 85° F., for at least 12 hours, preferably at least 24 hours.

Grinding the filter cake may be performed using a ball-miller or a roll-miller. In a preferred embodiment, the micronized barite particles are sieved after the grinding, and as a result the micronized barite particles may not contain barite particles with a particle size larger than 10 μm, preferably 5 μm. However, the micronized barite particles may include barite particles having a particle size smaller than 1 μm.

The examples below are intended to further illustrate protocols for preparing and characterizing the micronized barite particles and the drilling fluid composition, and are not intended to limit the scope of the claims.

Example 1

In the below examples, a method of producing local Saudi barite in micronized size (1 to 5 micron) is introduced. Local Saudi barite exists in huge quantities in several areas, its purity ranges between 88 to 99%. Impurities such as calcium fluoride, quartz, and calcium carbonate could be contaminated in the barite in these sources. In this invention we will provide a method that can target both pure and impure barite. For the pure one the target will be producing micron size and the target for the impure one will be to remove the impurities and producing it in micron size. The current available industrial grade barite is in 40 to 70 micron size. We proved that the micronized size of the Saudi barite will make more stable drilling and completion fluid and also will enhance the removal and cleaning processes. Local Saudi barite exists in huge amounts and most of this barite is not clean, it contains some impurities such as quarts and calcite. In this invention we introduce a single step method that will remove the impurities and produce the micronized size of the Saudi Barite.

Example 2

Two types of Saudi barite, i.e. the pure and impure one, have been discussed here. For the pure barite the objective will be to decrease the size to 1 to 5 micron by mixing the grinded barite with the following chelating agents; 1 to 5 wt % EDTA, and 5 to 10% GLDA at temperature range of 40 to 70° C. The mixture should be stirred at high rpm after that the solution can be filtered and the barite size will be reground again to obtain the 1 to 5 micron size.

The second type of Saudi barite is that the one contains some impurities such as carbonates, quartz, and calcium fluoride. For this one the treatment will be using the same mentioned chelating agents but with higher concentration. The impure barite will be mixed and stirred with the EDTA chelating agent (5 to 15 wt % concentration) or with GLDA chelating agent (10 to 20 wt % concentrations). The pH of both chelating agents should be higher than 11. The solution will be stirred at high rpm and temperature range of 40 to 70° C. The lighter materials those are not soluble in chelating agent such as quartz will be separated by gravity because it will precipitate at the surface of barite. Other impurities will be removed by the chelating agents.

Example 3

The following schematic shows the laboratory scale for the treatment of the impure local Saudi barite. FIG. 1 shows the method used in the laboratory to upgrade the local Saudi barite to pure and micron size one. The sandstone content reaches 11 to 12% in certain locations from the XRD analysis. In the large scale the sand can be extracted by designing ports at the interface between the barite and quartz based on the volume of the field treatment vessel. For example for barite purity of 89% with 11% by weight quartz (one of the samples we have treated), if 10,000 kg wanted to be treated it will contain 8900 kg barite and 1100 kg sandstone. This amount can be treated in cylindrical vessel with 3 m³ size. The port that should extract the quartz should be located at 2 m off the bottom of the vessel.

Example 4

Figure 2:
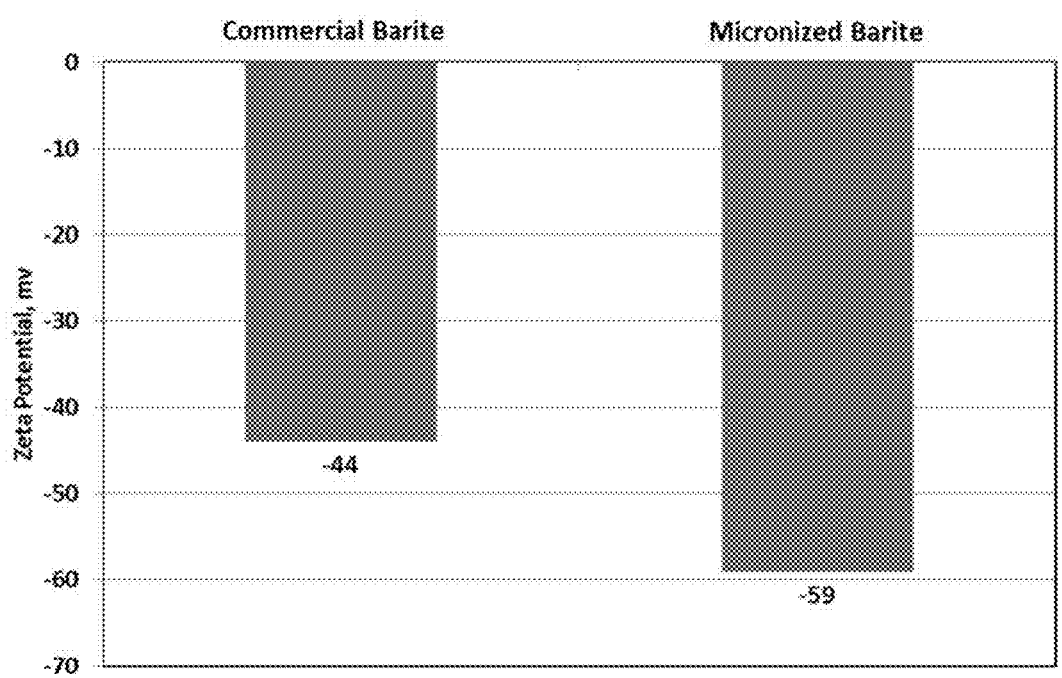
FIG. 2 represents a zeta potential of a drilling fluid composition that includes micronized barite particles versus a zeta potential of a drilling fluid composition that includes commercial barite particles.

Zeta potential measurements which are related to the dispersion ability of the solids in the solution were measured for the industrial grate barite and it was −44 mv as shown in FIG. 2. The size of the industrial grade barite ranges between 40 and 70 micron and the size of the treated local Saudi barite ranges between 1 and 5 micron.

Example 5

The production of smaller size barite will enhance the dispersion of the barite particles in both drilling fluids and cement slurries that are used for HPHT applications. This will prevent the problems associated with the drilling fluid such as the removal of the filter cake and the sagging problems. During the cementing operations in HPHT wells the cement settling problems of the cement weighting material is a common issue which needs squeezing or a secondary treatment for that cement and this might cause some problems in oil and gas wells. Water and gas can migrate through the bas cement and this will cause environmental problems. Using the micron size in cement will enhance the stability and dispersion of the barite weighting materials in cement and eliminate cementing problems. Also the micron size barite will produce good cement sheath behind the casing with high compressive strength and zero permeability and very low porosity. With the drilling fluid the micron barite will enhance the stability and eliminate the sagging problem that might cause bit balling. Also the micron size will enhance the removal of the filter cake.

Example 6

Micron barite will be added to the drilling fluid in sufficient amount and the proper sizing for other particles such as calcium carbonate the final formulation can be obtained. Micron barite will provide more surface area available for reaction with the filter cake removal fluid and this will enhance the filter cake removal process and less fluid volume and concertation will be used.

Figure 3:
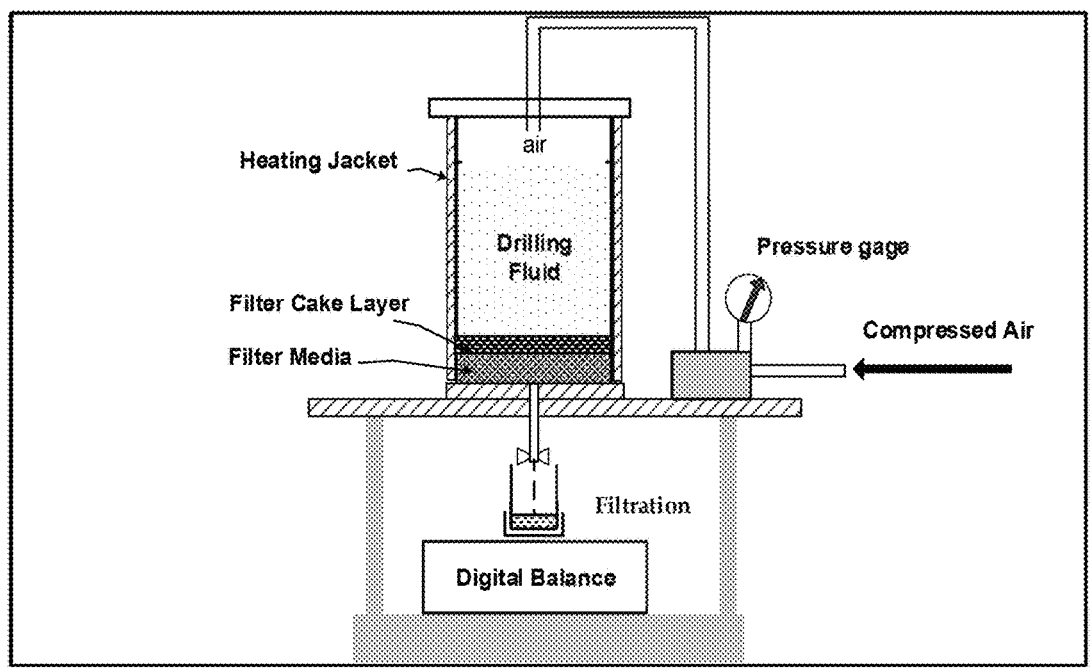
FIG. 3 is schematic of pressurizing a drilling fluid composition, wherein a barite filter cake is produced.
Figure 4:
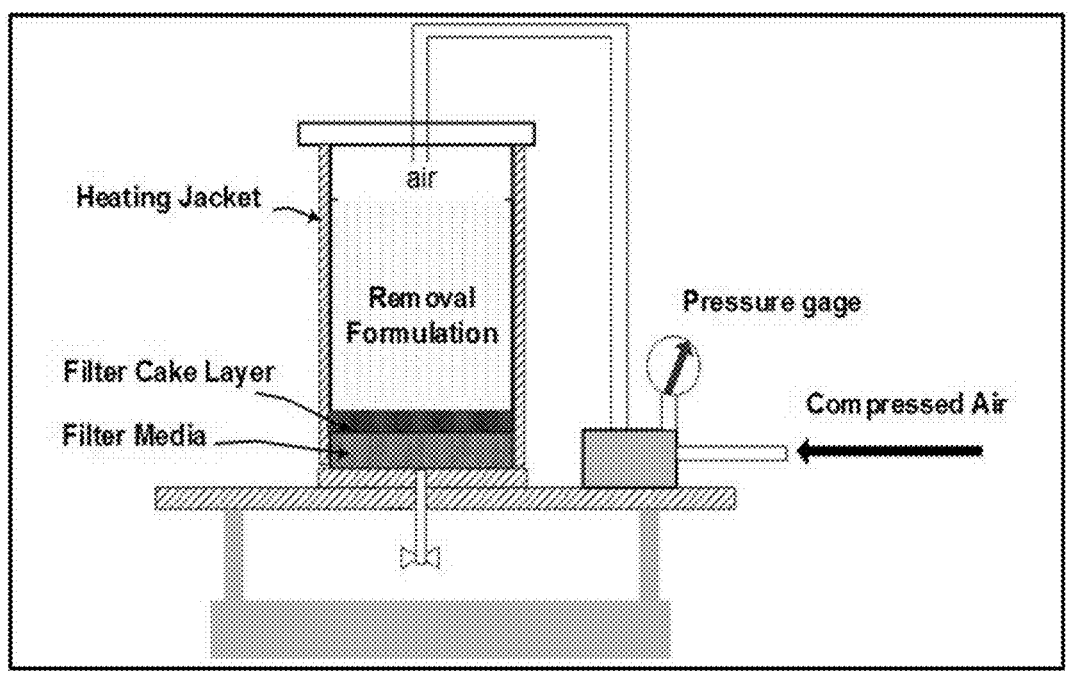
FIG. 4 is schematic of removing the barite filter cake.

FIGS. 3 and 4 show the formation and removal process of the filter cake formed by using micron barite as weighting material of the drilling fluid and the removal efficiency of the filter cake approached 93% compared to 85% with the industrial grade one.

Example 7

Figure 5:
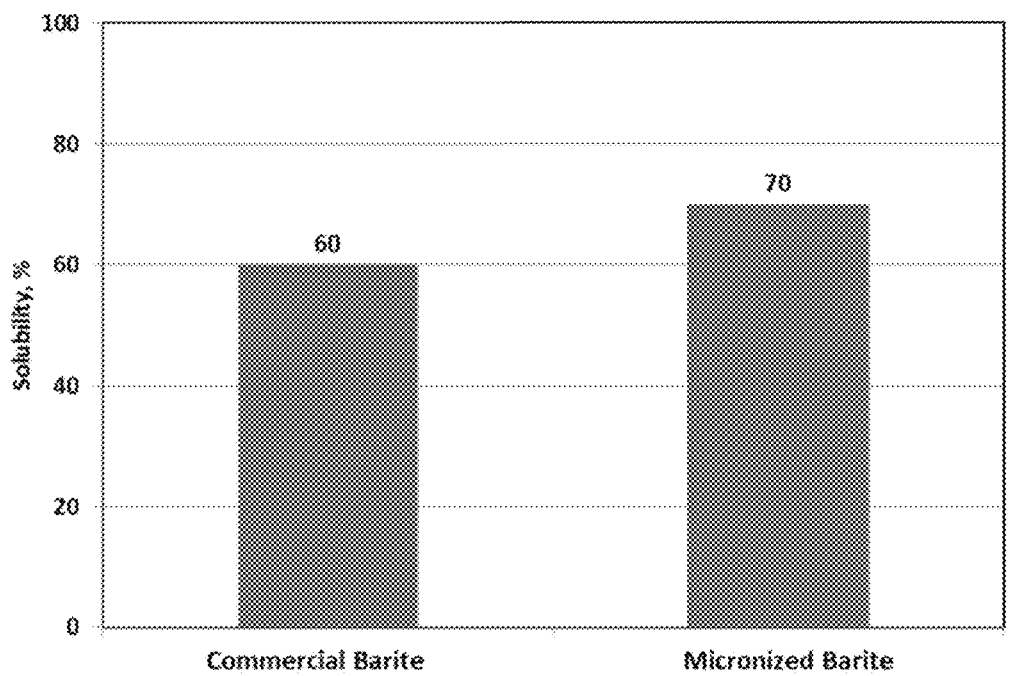
FIG. 5 represents a solubility of the micronized barite particles versus that of the commercial barite particles in a solution that contains 20% of $K_5DTPA$ (pH=11) at 200° F.

The solubility of the barite using 20% DTPA chelating agent was tested using two grades the industrial and upgraded Saudi one. FIG. 5 shows the solubility of the barite particles in 20% DTPA at 200° F. The solubility increased from 60 g/100 g (for the industrial grade barite) to 70 g/100 g (for the upgraded micron size local Saudi barite).

Example 8

Laboratory experiments were conducted to compare between the local Saudi barite and commercial barite as a weighting material for water-based drilling fluids for deep oil and gas wells. As a result, we observed that:
- At room temperature, the two samples yielded very close properties.
- At higher temperature, the Saudi local barite yielded a lower plastic viscosity and higher yield point compared to the commercial barite which is very important in hole cleaning and reducing the annular pressure losses during the drilling fluid circulation and this will save the pumping requirements.
- The YP/PV for local Saudi barite was 3.7 and with 1.8 for commercial barite at 250° F. This make the Saudi barite better in terms of hole cleaning than the commercial one.

Example 9—Water-Based Drilling Fluid Formulation

Table 1 lists the composition of the water-based drilling fluid, which contains water as the base phase, KOH to adjust the pH, bentonite (4 g) as a viscosifier, xanthan gum (1 g) for viscosity and fluid loss control, KCl (20 g) for shale stabilization, calcium carbonate as a bridging material, and Barite as a weighting material.

Two different samples of the drilling fluid were prepared. One sample contains the Saudi local barite and the other one contains commercial barite. The properties were measured at room temperature.

TABLE 1

Water-based drilling fluid composition.

| Component | Unit | Local Sample | Commercial Sample |
|---|---|---|---|
| Water | g | 245 | 245 |
| Soda ash | g | 0.5 | 0.5 |
| KOH | g | 0.5 | 0.5 |
| Bentonite | g | 4 | 4 |
| XC-polymer | g | 1 | 1 |
| KCl | g | 20 | 20 |
| CaCO3 medium | g | 5 | 5 |
| Barite | g | 200 | 200 |
| Sodium sulfide | g | 0.25 | 0.25 |

Example 10—Drilling Fluid Properties

Figure 6:
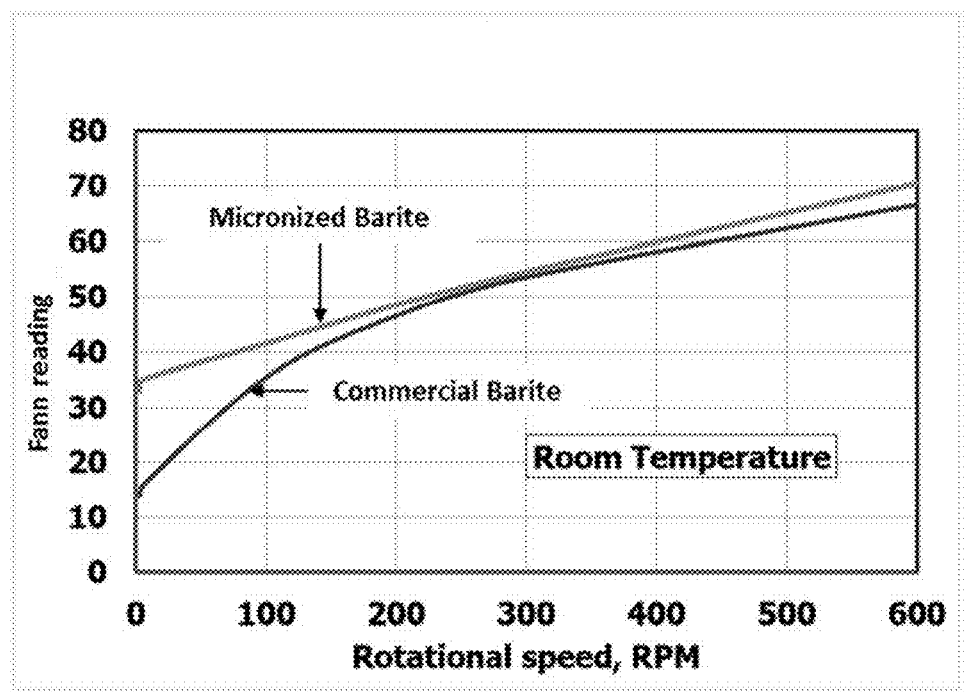
FIG. 6 represents a rheometer reading (Fann reading) of a drilling fluid composition that includes micronized barite particles versus a rheometer reading of a drilling fluid composition that includes commercial barite particles, at room temperature (i.e. about 85° F.).

At room temperature, both the formulations yielded very close results as listed in Table 2. The density 12.51 and 12.31 lb/gal was obtained for commercial and local barite sample, respectively. FIG. 6 shows the rheometer reading at different shear rates (rpm). It is clear that at high shear rates the two samples behaved the same, which can be described by Bingham plastic behavior.

TABLE 2

Drilling Fluid Properties at room Temperature.

| Property | Commercial Barite | Local Barite |
|---|---|---|
| Density, ppg | 12.51 | 12.31 |
| pH | 10.7 | 10.6 |
| Plastic Viscosity, cP | 13 | 16 |
| Yield Point, lb/100 ft$^2$ | 40.5 | 38.5 |
| Gel 10 sec, lb/100 ft$^2$ | 15 | 15 |
| Gel 10 min, lb/100 ft$^2$ | 20 | 20 |
| Gel 30 min, lb/100 ft$^2$ | 25 | 25 |

To evaluate the behavior at higher temperatures, the two samples were heated using HPHT rheometer to 200° F. and 250° F. under a pressure of 300 psi. Table 3 lists the dial reading at different temperature for the two samples.

Figure 7:
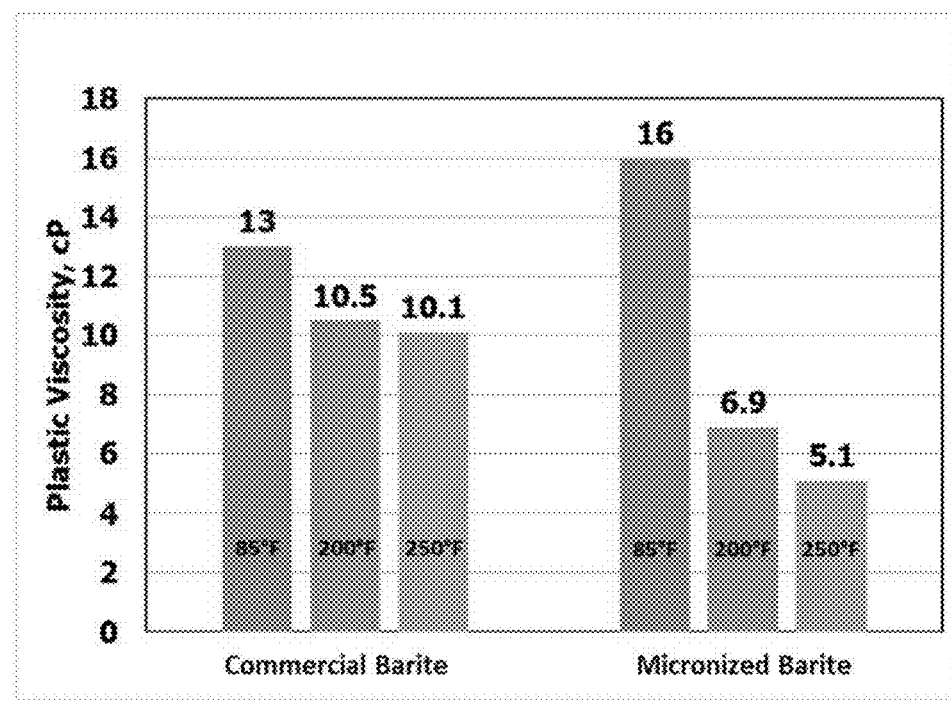
FIG. 7 represents a plastic viscosity of a drilling fluid composition that includes micronized barite particles versus a plastic viscosity of a drilling fluid composition that includes commercial barite particles, at different temperatures.

FIG. 7 shows the change in plastic viscosity with increasing the temperature for both samples. At higher temperature, 250° F., the local barite yielded low plastic viscosity compared to the commercial barite which indicated lower annular pressure needed to lift the fluid to the surface. As a result, reducing the equivalent circulation density and reducing the possibility of fluid losses and formation fracture.

Figure 8:
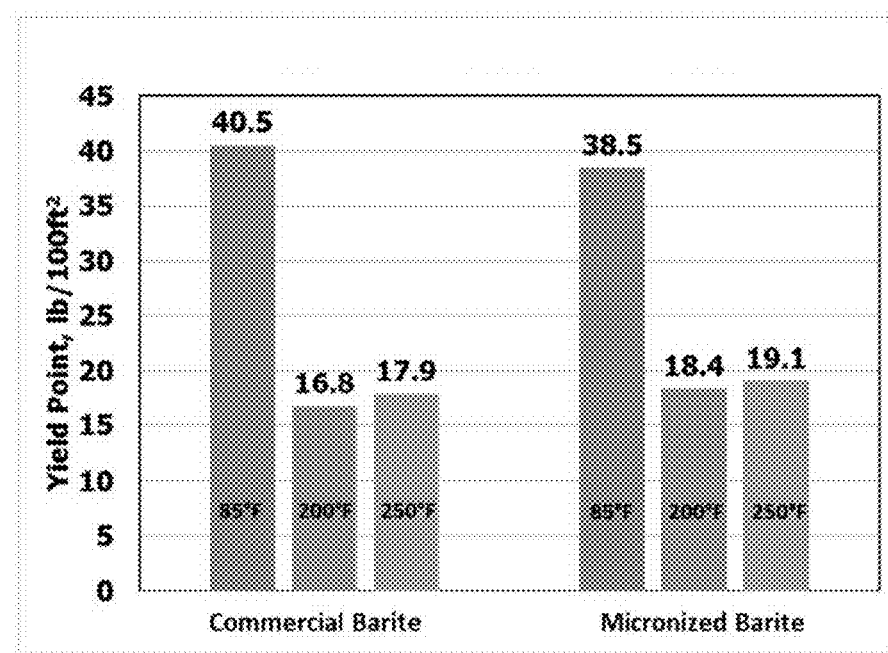
FIG. 8 represents a yield point of a drilling fluid composition that includes micronized barite particles versus a yield point of a drilling fluid composition that includes commercial barite particles, at different temperatures.

FIG. 8 shows that the yield point of the local barite sample is higher than the yield point of the commercial barite sample which will enhance the carrying capacity of the drilling fluid and hence enhance the hole cleaning and improve the drilling rate. The YP/PV ratio for local Saudi barite was 3.7 as compared with 1.8 for commercial barite at 250° F.

TABLE 3

Rheometer reading for local and commercial samples at different temperature.

| Temperature N | Room temperature φ | | 200° F. φ | | 250° F. φ | |
|---|---|---|---|---|---|---|
| | Commercial Barite | Local Barite | Commercial Barite | Local Barite | Commercial Barite | Local Barite |
| 3 | 14 | 33 | 6.6 | 17 | 7.3 | 15 |
| 6 | 16 | 35 | 8.6 | 18.7 | 8.7 | 17.5 |
| 100 | 35.5 | 41.5 | 18.8 | 20 | 19.3 | 20 |
| 200 | 46.5 | 48.5 | 24 | 22.7 | 24.2 | 22.2 |
| 300 | 53.5 | 54.5 | 27.3 | 25.3 | 28 | 24.2 |
| 600 | 66.5 | 70.5 | 37.8 | 32.2 | 38.1 | 29.3 |

Example 11—Advantageous of Local Micronized Barite Over the Commercial Barite

The local barite has lower plastic viscosity at higher temperatures; higher temperatures means deep wells and this will lower the equivalent circulating drilling fluid density and will lower the possibility of lost circulation and formation fractures.

The local barite drilling fluid has Yield point/plastic viscosity ratio greater than that for the commercial one which makes the local barite better in terms of hole cleaning. Hole cleaning increases with increasing the ration of YP/PV. Enhancing the hole cleaning will increase the drilling efficiency, and rate of penetration and in turn will lower the drilling cost.

The invention claimed is:

1. A method of fracturing a subterranean formation, comprising:
injecting a drilling fluid composition into the subterranean formation through a wellbore to fracture the subterranean formation and form fissures in the subterranean formation, wherein the drilling fluid composition comprises:
micronized barite particles with a particle size in the range of 1 to 5 μm;
an aqueous base fluid; and
a viscosifier,
wherein the micronized barite particles are present in the drilling fluid composition at a concentration in the range of 1 wt % to 50 wt %, relative to the total weight of the drilling fluid composition.

2. The method of claim 1, further comprising:
injecting a proppant into the subterranean formation through the wellbore to deposit the proppant in the fissures.

3. The method of claim 1, further comprising
circulating the drilling fluid composition within the wellbore after the injecting.

4. The method of claim 1, wherein the drilling fluid composition is injected at a pressure of at least 5,000 psi to fracture the subterranean formation.

5. The method of claim 1, wherein the viscosifier is bentonite.

6. The method of claim 1, wherein the drilling fluid composition has a plastic viscosity of 14 to 18 cP at a temperature of 80 to 90° F.

7. The method of claim 1, wherein the drilling fluid composition has a plastic viscosity of 4.5 to 7.0 cP at a temperature of 200 to 280° F.

8. The method of claim 1, wherein the drilling fluid composition has a density of 12 to 14 ppg at a temperature of 80 to 90° F.

9. The method of claim 1, wherein the drilling fluid composition has a yield point of 35 to 45 lb/100 ft$^2$ at a temperature of 80 to 90° F.

10. The method of claim 1, wherein the drilling fluid composition has a gel strength of 15 to 25 lb/100 ft$^2$ at a temperature of 80 to 90° F., after 10 seconds.

11. The method of claim 1, wherein the drilling fluid composition has a yield point-to-plastic viscosity ratio of 2.5 to 4.5.

12. The method of claim 1, wherein the drilling fluid composition has a zeta potential of 55 to 65 mV.

13. The method of claim 1, wherein the drilling fluid composition further comprises:
at least one additive selected from the group consisting of an antiscalant, a thickener, a deflocculant, an anionic polyelectrolyte, a lubricant, and a fluid loss additive.

14. The method of claim 1, wherein a solubility of the micronized barite particles in the aqueous base fluid is at least 70 g/100 g at a temperature of 150 to 250° F.

* * * * *